(12) United States Patent
Mombrinie

(10) Patent No.: US 11,292,585 B2
(45) Date of Patent: Apr. 5, 2022

(54) STOL AIRCRAFT

(71) Applicant: Bruno Mombrinie, Forestville, CA (US)

(72) Inventor: Bruno Mombrinie, Forestville, CA (US)

( * ) Notice: Subject to any disclaimer, the term of this patent is extended or adjusted under 35 U.S.C. 154(b) by 192 days.

(21) Appl. No.: 16/613,035

(22) PCT Filed: May 14, 2018

(86) PCT No.: PCT/US2018/032568
§ 371 (c)(1),
(2) Date: Nov. 12, 2019

(87) PCT Pub. No.: WO2018/213190
PCT Pub. Date: Nov. 22, 2018

(65) Prior Publication Data
US 2020/0156770 A1      May 21, 2020

Related U.S. Application Data

(60) Provisional application No. 62/505,890, filed on May 13, 2017.

(51) Int. Cl.
| | | |
|---|---|---|
| B64C 25/14 | (2006.01) | |
| B64C 25/24 | (2006.01) | |
| B64D 27/24 | (2006.01) | |
| B64C 25/00 | (2006.01) | |
| B64C 25/40 | (2006.01) | |
| B64D 35/02 | (2006.01) | |

(Continued)

(52) U.S. Cl.
CPC ............ *B64C 25/14* (2013.01); *B64C 1/0683* (2020.01); *B64C 25/24* (2013.01); *B64C 25/26* (2013.01); *B64C 25/405* (2013.01); *B64D 27/24* (2013.01); *B64D 35/02* (2013.01); *B64D 41/00* (2013.01); *B64C 25/001* (2013.01); *B64C 2025/008* (2013.01)

(58) Field of Classification Search
CPC ......... B64C 25/14; B64C 25/24; B64C 25/26; B64C 25/405; B64C 25/001; B64C 2025/008; B64D 27/24; B64D 35/02; B64D 41/00
See application file for complete search history.

(56) References Cited

U.S. PATENT DOCUMENTS

| | | | | |
|---|---|---|---|---|
| 2,909,342 A | * | 10/1959 | Maltby | ................... B64C 25/00 244/103 R |
| 2,933,270 A | | 4/1960 | Maltby | |

(Continued)

FOREIGN PATENT DOCUMENTS

| | | |
|---|---|---|
| FR | 2951697 A | 4/2011 |
| GB | 526904 | 9/1940 |

(Continued)

*Primary Examiner* — Rodney A Bonnette

(57) ABSTRACT

An electrically powered STOL aircraft having dedicated motors energized to deploy movable landing gear driven to propel short takeoffs and to actively rotate downwardly to engage the runway surface as the aircraft approaches touchdown on landing. The front and rear landing gear, or both, may be powered and actuated in the landing process with braking to shorten the landing distance, each driven landing gear wheel having a dedicated electric motor and coaxial brake.

5 Claims, 20 Drawing Sheets

(51) Int. Cl.
*B64D 41/00* (2006.01)
*B64C 25/26* (2006.01)
*B64C 1/06* (2006.01)

(56) References Cited

U.S. PATENT DOCUMENTS

| | | | |
|---|---|---|---|
| 3,329,376 A | | 4/1967 | Sullivan |
| 3,511,455 A | | 5/1970 | Weick |
| 4,881,700 A | * | 11/1989 | Sarh .................. B60F 5/02 244/2 |
| 5,758,844 A | | 6/1998 | Cummings |
| 5,915,649 A | * | 6/1999 | Head ................. B64C 37/00 244/7 A |
| 6,854,689 B1 | | 2/2005 | Lindahl et al. |
| 7,249,736 B2 | | 7/2007 | Clark |
| 2009/0045295 A1 | | 2/2009 | Lundgren |
| 2009/0076668 A1 | | 3/2009 | Lynas et al. |
| 2016/0229529 A1 | | 8/2016 | Christensen et al. |
| 2018/0001999 A1 | * | 1/2018 | Page ................. B64C 39/10 |

FOREIGN PATENT DOCUMENTS

| | | |
|---|---|---|
| GB | 1593393 A | 7/1981 |
| RO | 131684 | 2/2017 |

\* cited by examiner

STOL AIRCRAFT

BACKGROUND OF THE INVENTION

Technical Field

The present invention relates most generally to fixed wing aircraft, and more particularly to an electrically powered fixed wing aircraft, and still more particularly to an STOL electric aircraft suitable for extremely short field takeoffs and landings in an urban environment.

Background Art

Visit any large urban area today and you almost immediately experience transportation problems. Short rides using surface transportation (bus, car, taxi) can take longer than walking the same route and distance at a leisurely pace. Subways and trains are overcrowded and correspondingly unpleasant. Population growth and urban migration models and predictions make clear that the problems will only get worse.

In consequence, there is considerable activity to devise transportation alternatives that reduce the load on existing systems. One approach takes advantage of the almost entirely untapped urban space above us—the sky above streets and buildings.

Current work and research is principally being conducted at a frenetic pace by tech, peer-to-peer ride-sharing, and aircraft companies, to devise and design aircraft suitable for use in an urban "air taxi" system. Airbus, Boeing, Google, Pipistrel, NASA, and others have thrown their hats into the ring. Without exception, their early and prototype designs derive from existing vertical takeoff and landing (VTOL) drone and helicopter designs, including tilt wing, ducted fan, helicopters, cyclogyros, tiltrotors, and so forth. The express intention is that the aircraft be able to utilize building tops as skyports. Highly layered urban traffic control areas for such use are also contemplated.

We may see the realization of a fully functional urban air mobility system within a decade. New, high-powered electric motors and power management controllers for aviation are available. New air traffic management hardware and artificial intelligence systems to control individual aircraft and provide safe separation from other aircraft in the system are being studied. Pilotless and Optionally Piloted Aircraft (OPA) and other types of autonomous aviation controls are also being developed. However, proposed aircraft designs for use in urban environments are, without exception, of the VTOL type.

Unfortunately, VTOL aircraft known to date, including electric aircraft, have numerous disadvantages, most notably in creating high noise and consuming significant energy on takeoff and landing. Accordingly, it may be desirable to provide a more conventional aircraft to achieve the same objectives of VTOL design for an air taxi or urban air mobility system.

An alternative to VTOL aircraft are short takeoff and landing (STOL) aircraft. These aircraft are common; their primary advantage over conventional aircraft is that they are able to operate from short runways. They have been widely used for military transport since the 1950s and as "bush" planes in remote wilderness areas. The shortcoming of STOL aircraft is that the landings are generally ill-adapted for urban environments.

What is needed, therefore, is an improved STOL aircraft capable of quiet and energy efficient operation in an urban environment, using building-top runways of reasonably short length.

DISCLOSURE OF INVENTION

The aircraft of the present invention includes a novel type of landing gear that makes it possible for the aircraft to achieve short takeoffs and smooth, short landings in approximately 60 meters or less. The application for the inventive aircraft and its advanced landing gear is for an all-electric STOL plane capable of high cruise speeds (up to 400 km/hr) (250 mph) in nearly all weather conditions.

Acceleration and deceleration are expressed in units of g-force, or "g". The derivative of acceleration with respect to time (or the change in the rate of acceleration/deceleration) is known as "jerk", and it is measured in g/sec.

Most individuals easily tolerate acceleration/deceleration rates over 2 g without alarm or discomfort if the rate is gradual, smooth, and uninterrupted. A commercial airliner landing has fairly low deceleration but high jerk rates. Jolts and bumps even at a low 0.5 g feel jarring and alarming for some people.

To accommodate a wide range of individual comfort levels, takeoffs and landings must be reassuringly smooth and free of whiplash, jolts, let-ups, shakes, and bumps. A straightforward and effective way to achieve short distance takeoffs is by simply accelerating, or driving the plane to takeoff speed. The inventive aircraft employs a driven wheel that is positioned far aft of the center of gravity (COG) to prevent tip back. However, because the drive wheel is back from the COG, the plane rotates less easily at takeoff. To balance the desired performance characteristics, rotation is forced at the end of the takeoff run using motorized front landing gear that effectively drives the nose up at takeoff. The same motorized mechanism is used to soften the landings.

STOL landings are also challenging. The landing distance must not only be short, but the plane must consistently hit a very narrow touchdown mark, all while coming in fast and decelerating hard in choppy conditions. Even with advanced robotic controls, this cannot be achieved while following a smooth, jolt-free path. How, then, is it done?

The inventive aircraft includes sensors that envelope the plane and precisely measure the distance to the ground as the plane passes into the touchdown zone. When the plane passes over the touchdown zone within ±0.5 meters (20 in) of a target height, motorized landing gear is rapidly deployed and closes the distance between the plane and the ground. The wheels touchdown solidly, but do not bounce the plane. The front landing gear touches well ahead of the COG, and the entire weight of the plane is immediately shifted off the wing and onto the wheels without any concern for nosing over during hard braking. The front wheels disposed on the outer ends of the landing gear struts take over to decelerate the plane and the legs gently lower the body of the plane to a resting position.

Other novel features which are characteristic of the invention, as to organization and method of operation, together with further objects and advantages thereof, will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to, and forming part of, this disclosure. The invention resides not in any one of these features taken alone, but rather in the particular combination of all of its structures for the functions specified.

BRIEF DESCRIPTION OF THE DRAWINGS

The invention will be better understood and objects other than those set forth above will become apparent when consideration is given to the following detailed description thereof. Such description makes reference to the annexed drawings wherein.

BEST MODE FOR CARRYING OUT THE INVENTION

Figure 1:
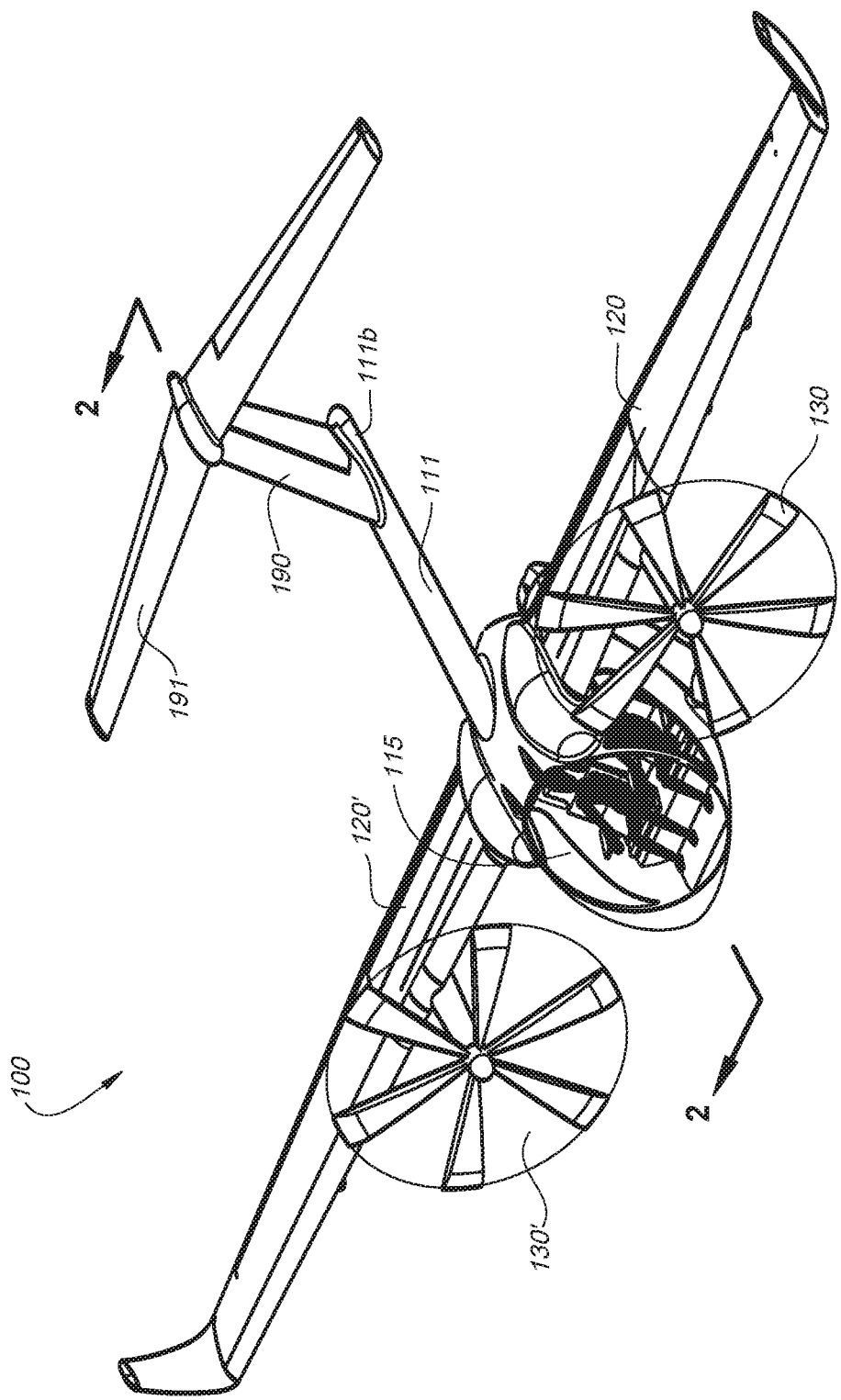
FIG. 1 is an upper front perspective view showing the STOL aircraft of the present invention in flight with two occupants.
Figure 2:
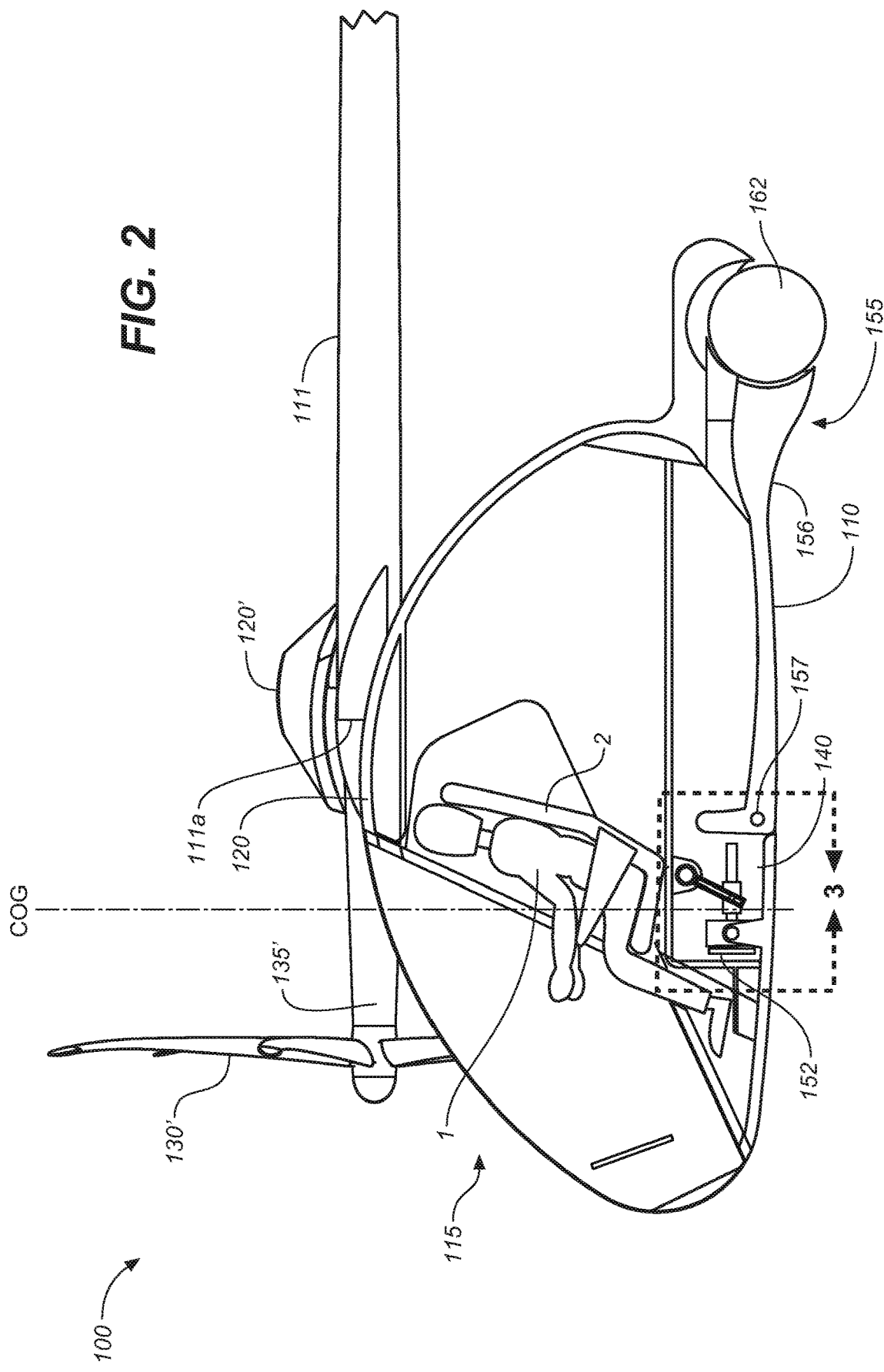
FIG. 2 is a schematic cross-sectional left side view in elevation taken along section line 2-2 of FIG. 1, this view not including the aft portion of the frame member and empennage.

Referring first to FIGS. 1 through 15, wherein like reference numerals refer to like components in the various views, there is illustrated therein a new and improved STOL Aircraft, generally denominated 100 herein.

Preferred embodiments of the aircraft 100 achieve short takeoffs and landings whether piloted or unpiloted, as in remotely controlled drone flight. In the preferred embodiments having the shortest takeoff and landing distance, the avionic systems control critical landing gear movements and the overall landing gear configuration to coordinate gear positions with one or more of the following conditions, including height, airspeed, ground speed, and runway position.

In accordance with the present invention the STOL aircraft 100 comprises a central fuselage 110 that supports left and right wings 120 and 120'. Empennage (tail wing assembly) 190 includes elevators 191. The empennage may be any of a high-wing, low-wing, or mid-wing design.

Fuselage 110 in preferred embodiments deploys a globular cockpit 115 and can provide or be extended to provide a cargo bay. The fuselage includes an axially disposed aft frame member 111 that supports the tail assembly at the distal end 111b, with the proximal end 111a joined at the common wing junction above the globular cockpit.

In preferred embodiments the front landing gear 150 is deployed in the landing process to absorb energy, and both the front and rear landing gear configurations and operation enable short takeoff distances.

Figure 3:
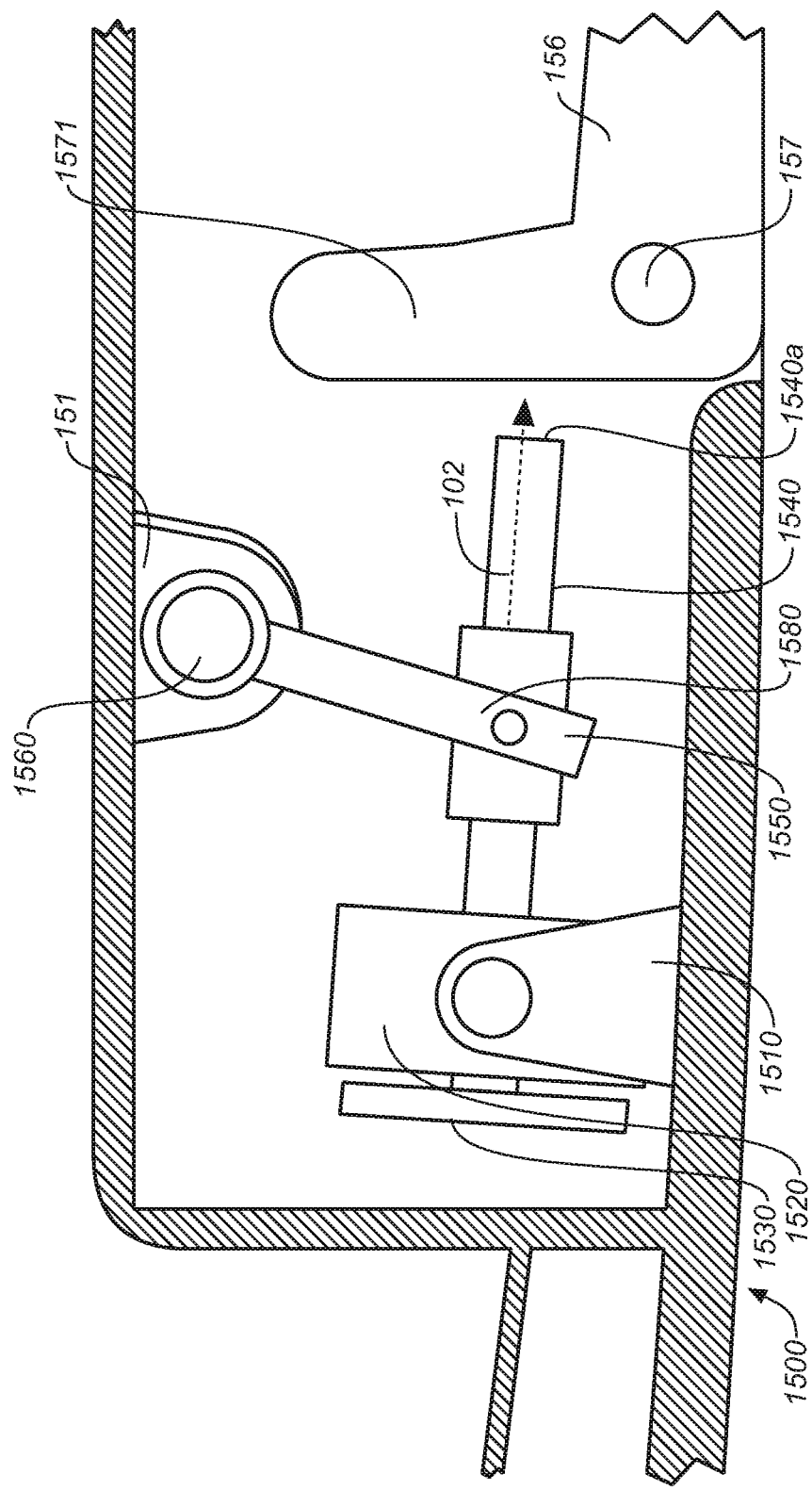
FIG. 3 is a detailed cross-sectional left side view in elevation showing a portion of the forward landing gear drive mechanism as taken along section line 3-3 of FIG. 2.

The front landing gear 150 preferably comprises a pair of struts 151/151' on opposing right and left sides of the fuselage 110, each with the drive mechanism shown in FIG. 3.

The preferred modes of takeoff and landing are further enabled by the configuration of the fuselage and other heavy components that position the center of gravity (COG) between the front and rear landing gear.

The two front landing gear struts 151, 151' and the rear landing gear strut 156 are each driven by a separate motor, preferably electric.

Figure 4:
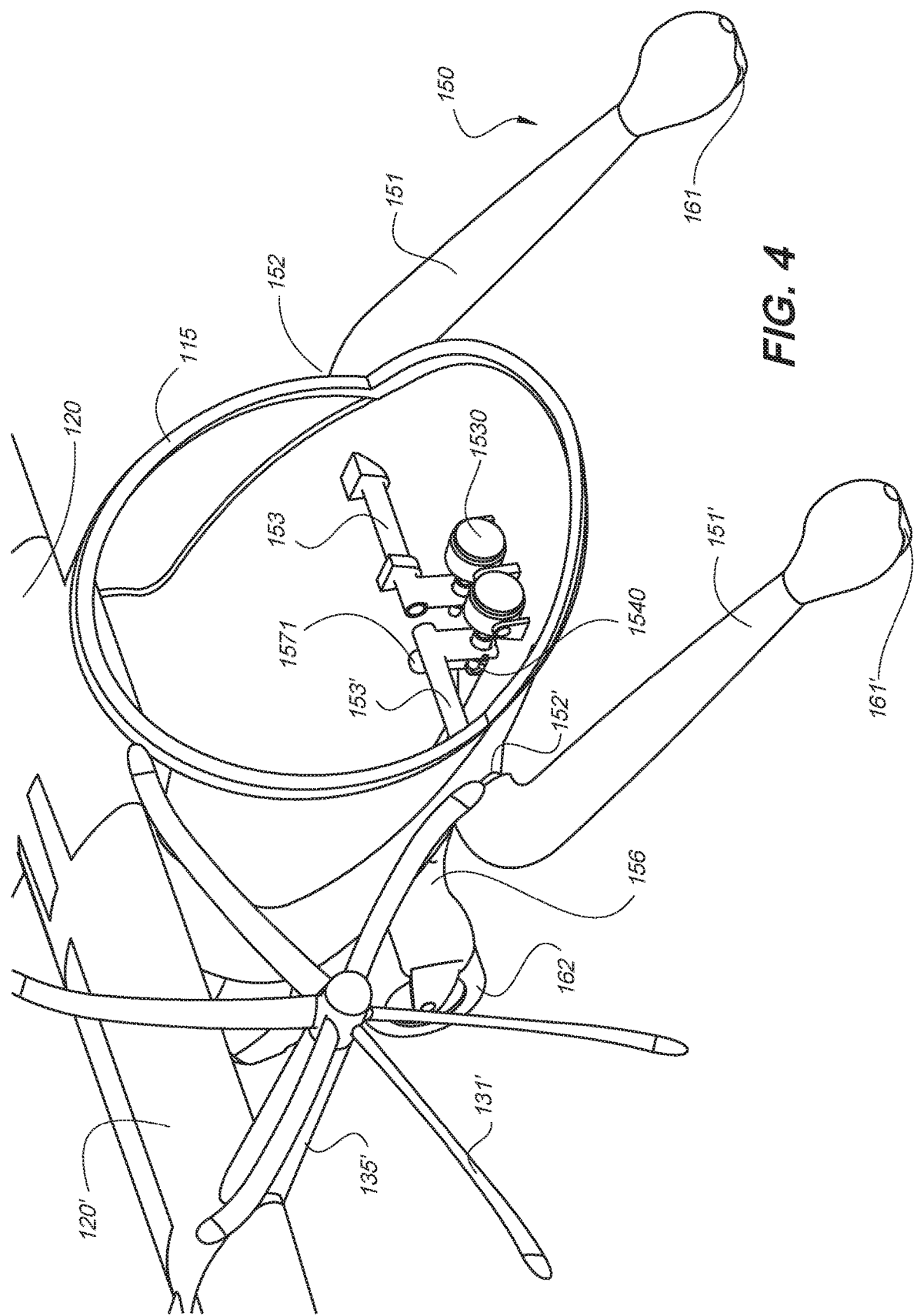
FIG. 4 is an upper front right perspective view showing both arms of the forward landing gear and drive forward landing gear drive.
Figure 5:
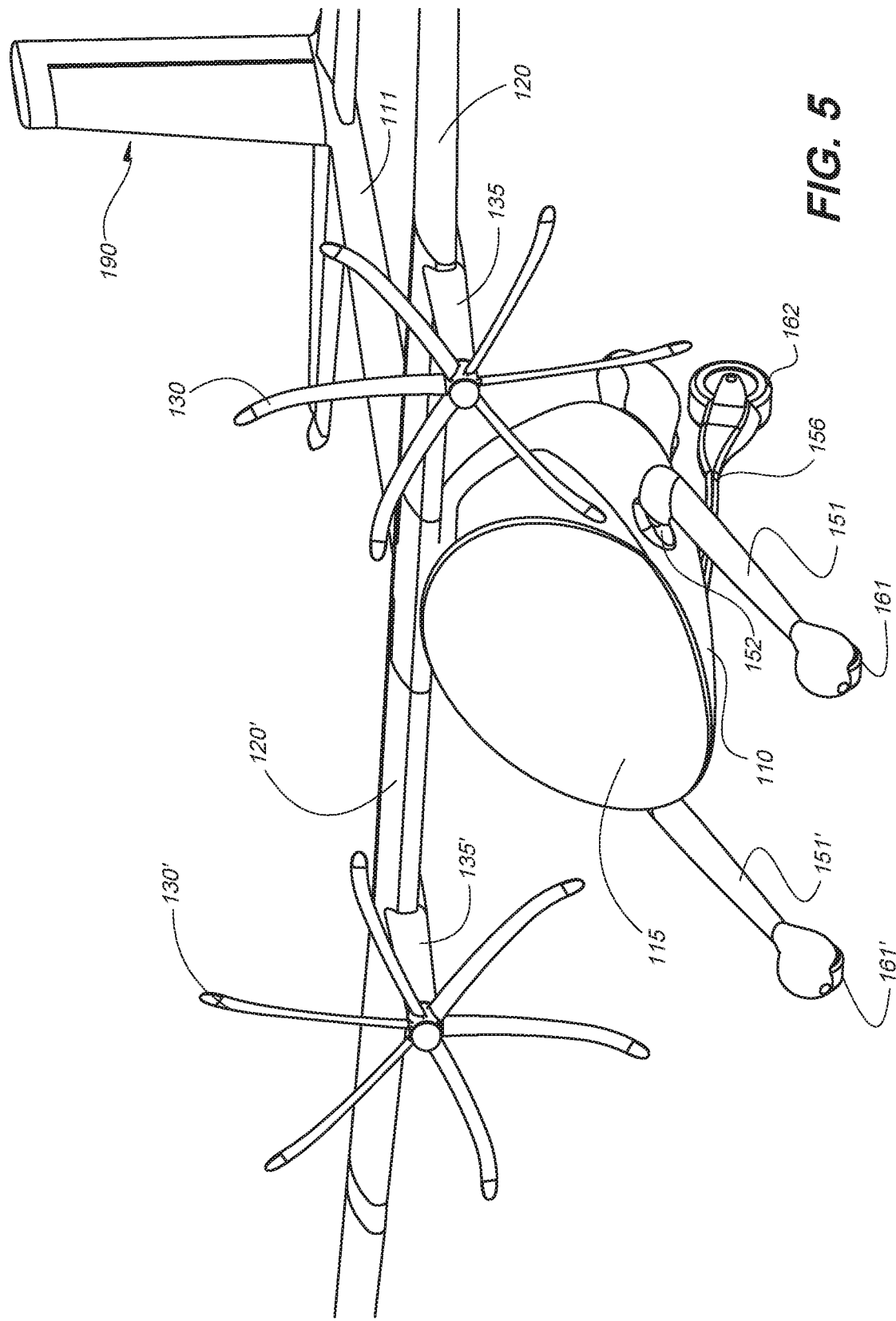
FIG. 5 is an upper front left perspective view showing the aircraft in a taxi configuration.

Front landing gear 150 and rear landing gear 155 are connected to the globular cockpit 115. As shown in FIGS. 1 and 4-5, the front landing gear 150 includes a pair of linear struts 151/151' coupled to the fuselage or cockpit 115 by a rotary joint 152 at a proximal end with the distal end supporting at least one wheel 161/161' in rotary engagement.

The rear landing gear 155 deploys a linear strut 156 and includes a wheel 162 at a distal end, and a pivotal connection to the fuselage 110 or cockpit 115 using a rotary joint or coupling 157. Wheel 162 is driven by an in-line motor (not shown) to accelerate the aircraft for takeoff. It is preferably operatively coordinated with the movement of the front landing gear 150 by a Ground-Air-Made-Short (GAMS) landing gear 1500.

Successful short runway landings require that the aircraft wheels touch down in a narrow range in the landing zone. The requirements may be on the order of a tenth of a second for the minimum potential runway length. The means to achieve such exactitude is to have the landing gear "reach" for the ground at the exact moment needed, which means that the landing gear is actively rotated downwardly in relation to landing conditions data relating to height over the runway, position in the landing zone, ground speed, vertical speed, and so forth. As the aircraft nears the runway, the avionics control system rotates the landing gear down to engage the ground before the gear would otherwise contact the ground on a glide path for decelerating the plane.

The other part of the solution is to eliminate wing loading and transfer weight onto the landing gear to maintain high deceleration through wheel braking. As speed drops, high deceleration is difficult to achieve aerodynamically. It is a key requirement, therefore, to initiate and produce as much forward horizontal deceleration in the air and maintain that deceleration during landing.

The GAMS landing gear 1500 employs a motor 1520 to position the front landing gear 150 and rear landing gear 155. The same assembly includes a disc brake 1530 to dissipate the vertical sink energy. The elongate and relatively long landing arms or struts 151/151' and 156 are dimensioned to accommodate a wide variety of approach conditions and to ensure that the aircraft does not bounce or porpoise on touchdown and rollout.

The front landing gear 150 deploys the wheel supporting struts 151 downwardly when they are in a range of distance from the ground that they will touch the ground as they descend. The contact is sensed so that the wings can then be actively and rapidly unloaded of lift (using, for instance, spoilers), so vertical deceleration is absorbed by the forward landing gear brakes as well as the wheel brakes that absorb horizontal deceleration.

A long wheelbase (the distance between front wheels 161 and rear wheel 162) when the gear is deployed may be advantageous for acceleration on takeoff, but it is disadvantageous for rotation on takeoff. Wheeled vehicle acceleration and deceleration requires a long wheelbase with the center of gravity near the midline. The need for easy and quick embarkation introduces further challenges. An aircraft with a long wheelbase cannot take off without powered assistance. Thus, the same GAMS power unit is employed to force the aircraft to rotate for takeoff.

In a preferred embodiment, a plurality of electric motors provide land and flight propulsion.

In another preferred embodiment, at least one landing gear wheel drives the plane on the ground to the lift off speed. The strut portion of the gear is then driven to provide upward thrust at lift off. The upward thrust from the landing gear adds to the lift provided by wings. The GAMS mechanism of FIG. 3 is the preferred mechanism to provide this function.

The preferred embodiments of the aircraft 100 are expected to have a runway length requirement of 60 meters or less.

The GAMS power unit 1500 is illustrated in detail in FIG. 3, in which a motor 1520 supported on a yoke 1510 has a shaft 1540 that is supported by a ball screw joint 1550. The rear landing gear strut is configured as a form 1 lever having a rotary joint coupling as the fulcrum. The end of the shaft 1540a is rapidly urged (in the direction of arrow 102) against the arm 1571 of the rear wheel strut 156, rotating the strut and forcing the wheel 162 downward. The motor 1520 rotation is stopped by the disc brake 1530.

On landing, shaft 1540 moves in the reverse direction, counter rotating the motor to absorb the energy of landing as the strut 156 moves upwardly, with the energy also absorbed by the disc brake 1530. Landing energy can also be absorbed by one or more conventional shock absorbers, such as various forms of springs, as well as active suspension systems that may deploy electromagnetic actuators, as well as combinations thereof. Such energy absorbing systems can have any combination of linear and non-linear energy absorption.

The GAMS power unit also operates to lift and deploy the forward wheels 161/161' by rotating struts 151/151'. The forward wheel struts 151/151' each have a lateral shaft 153/153' coupling to rotate as the hinged coupling 1560 is rotated by the ball screw actuator arm 1580 that couples in turn to the ball joint 1550 that receives the threaded shaft 1540 connecting to the motor 1520. Other motors drive the propellers, landing gear, control surfaces, and wheels for ground propulsion, and are powered by a modular battery 140 capable of fast interchange for quick turnaround.

An energy or power source 140 provides energy to power the motors 135/135'. One or more primary motors which drive one or more propellers 130/130', which may be two motors 135 and 135' mounted on the left 120 and right 120' wings. A modular battery 140 is a preferred power source. The modular battery 140 may be mounted to the fuselage 110 or aircraft so that it can be jettisoned rapidly in the event of fire or any other impending hazardous state or condition. The power source 140 can be a sort of solid state battery as well as a fuel cell and a source of hydrogen for the fuel cell. Alternatively, the power source can be liquid fuel that drives an internal combustion motor, which in turn generates electricity by driving an electric dynamo-machine, i.e., a generator.

It should also be appreciated that it is preferable that the COG is disposed between the front landing gear 150 and rear landing gear 155 by the central placement of the passenger seats and the power supply.

The battery is preferably supported by translating it longitudinally within the airframe to adjust the COG with respect to the load from passengers or freight. Placement of battery, cargo containment means (and other heavy components) within the fuselage 110 and cockpit 115 properly positions the COG.

An optional cargo bay is preferably a module that forms part of the outer skin on the fuselage behind the cockpit.

Figure 15:
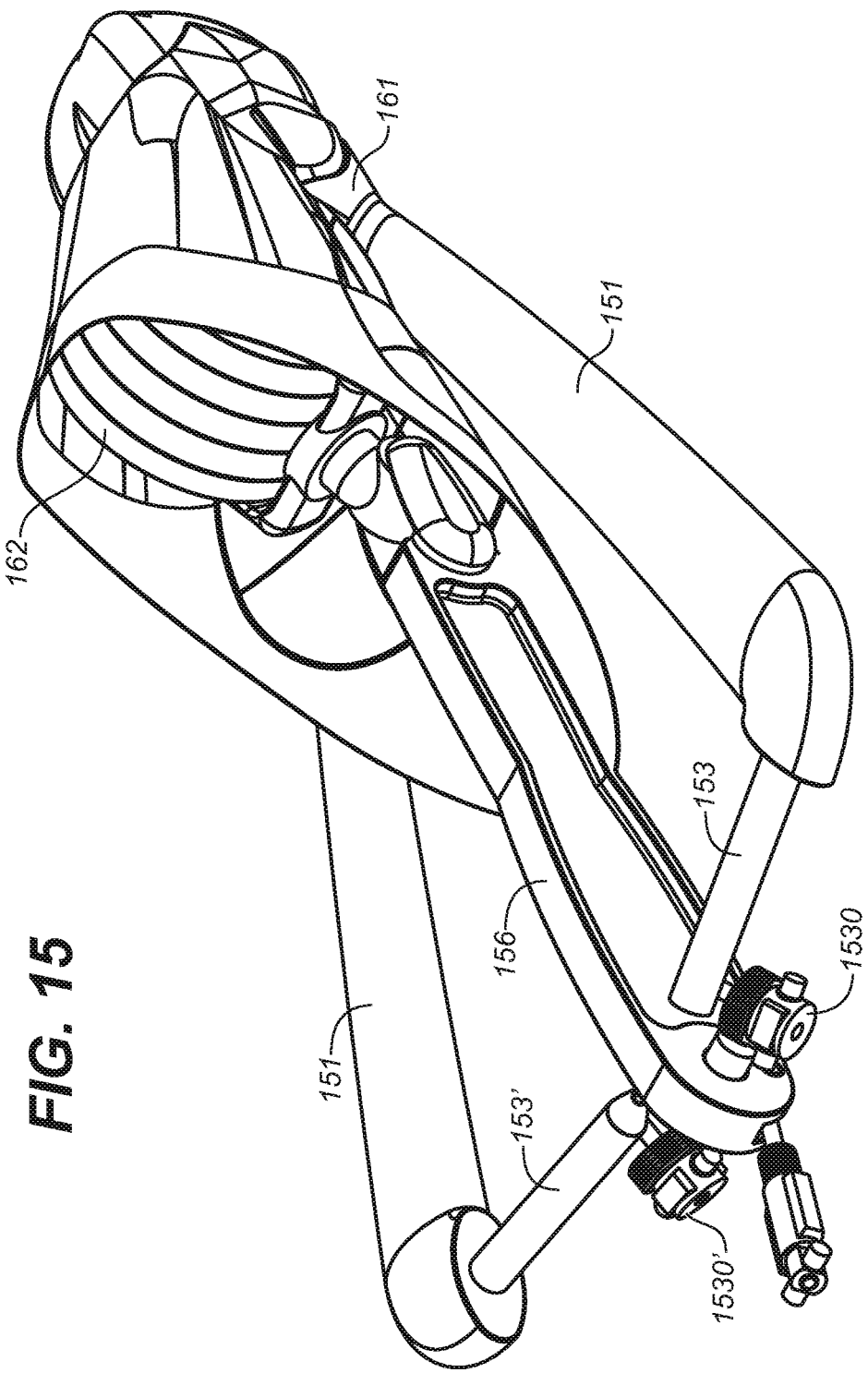
FIG. 15 is an upper front left perspective view of the front and rear landing gears in a fully retracted and stowed configuration.

Looking next at FIG. 15 there is shown the front landing gear and rear landing gear modules, each isolated and physically removed from the airframe and shown in a fully retracted configuration, as they appear when the aircraft is in midflight cruise operation.

Figure 16:
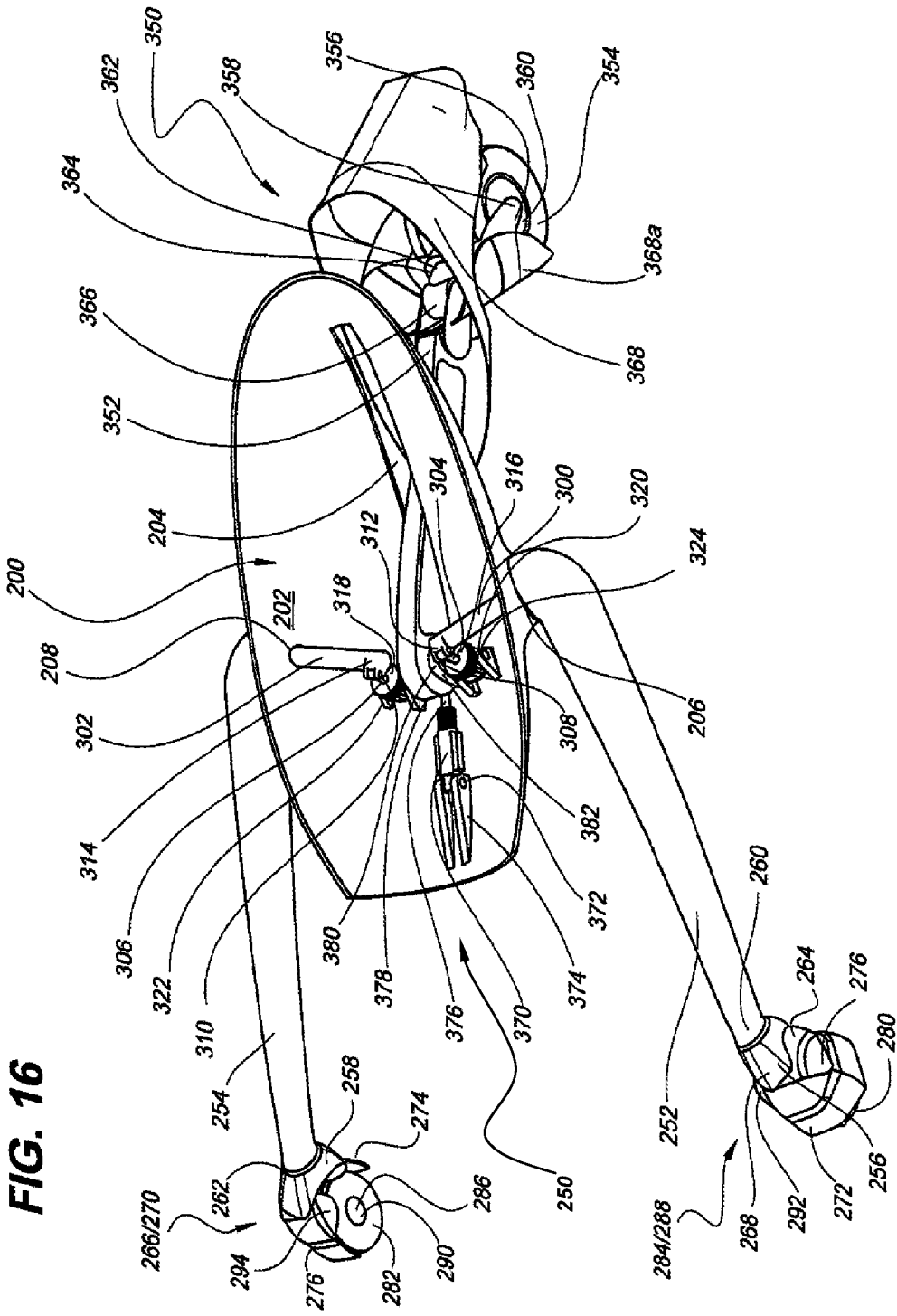
FIG. 16 is an upper left perspective view showing the structural and operational elements of the front and rear landing gear.

Referring now to FIG. 16, details of an embodiment of the landing gear structures and operational drive systems are shown. Reference numbers from the earlier views for like elements are not carried over here; instead new reference numbers are provided for similar earlier identified structures as well as for newly identified detail features.

FIG. 16 illustrates that in an embodiment the front and rear landing gear assemblies structurally connect to, and operate in relation to, the aircraft airframe 200 so as to form a system suited for STOL operations. The airframe 200 (for convenience arbitrarily shown here as a section of indeterminate size) supports and connects to a front landing gear module 250 and a rear landing gear module 350. The airframe includes an interior surface or side 202, a longitudinally-oriented center slot 204, and left and right (port and starboard) sockets 206, 208, respectively. The front landing gear module 250 is operatively and pivotally connected to the airframe and its interior side 202 through the port and starboard sockets 206, 208.

The front landing gear module includes port and starboard struts or legs 252, 254, respectively. Each leg includes, at a distal end, a fetlock 256, 258, pivotally connected to the leg at a fetlock pivot 260, 262; a front cradle 264, 266 (latter not showing) pivotally coupled to the fetlock at a cradle pivot 268, 270 (latter not shown); a cowling 272, 274 pivotally connected to the front cradle at a cowling pivot 276, 278; and terminating in driven wheels 280, 282, rotatingly disposed on axles 284, 286 (port side not visible). Drive systems/motors 288, 290 are provided for each wheel (again, port side not visible). Clamshell doors 292, 294 may be provided to enclose the wheels in flight.

Each front landing gear strut 252, 254 (port and starboard) terminates as an inboard rotatable deployment/retraction axle 300, 302, each axle disposed through an airframe socket, port and starboard, 206, 208, respectively. Each axle is driven by a lead screw 304, 306 pivotally connected to the axle with a pintle/gudgeon coupling 308, 310. The coupling and axle form bell cranks 312, 314.

Electric motors 316, 318 are mounted to the airframe interior side 202 with a trunnion/bracket mount 320, 322, which extend their respective lead screws to retract the corresponding strut or retract their respective lead screws to deploy or extend the respective strut. Motor trunnions pivot at pivot points 324, 326 (latter not clearly visible). Motor control for both the deployment/retraction of the landing gear struts and for their respective drive wheels resides in system avionics described more fully below.

In the embodiment shown in FIG. 16, the rear landing gear module 350 includes a rear leg strut 352 having a driven rear wheel 354 rotatingly coupled to the strut through an assembly that includes an axle 356 disposed through a rear wheel fork 358. A rear wheel drive system 360 is operatively coupled to the rear wheel. The rear wheel fork 358 is pivotally coupled to a rear wheel gimbal 362 through a fork/gimbal pivot 364. In turn, the gimbal 364 is pivotally coupled to the rear strut 352 through a gimbal/strut pivot 366. A rear wheel fairing 368 partially encloses the rear wheel, the enclosure selectively completed by a tail fairing door 368a.

The rear landing gear, like the front landing gear, is driven by a strut drive system, 370, which in embodiments is an electric motor. It is mounted on the airframe inner side with a motor trunnion 372 pivotally mounted on a trunnion bracket 374. The motor drives a lead screw 376 that engages a rear strut clevis 378 to pivot the strut on a rear strut shaft 380 disposed in a trunnion carriage 382. Motor control again resides in avionics control systems, described more fully below.

Operation of the landing gear modules just described may be seen by referring now to FIGS. 6-13, 17 and 19, where there is shown a range of the dynamically adaptive landing gear configurations during landing and takeoff sequences.

Figure 17:
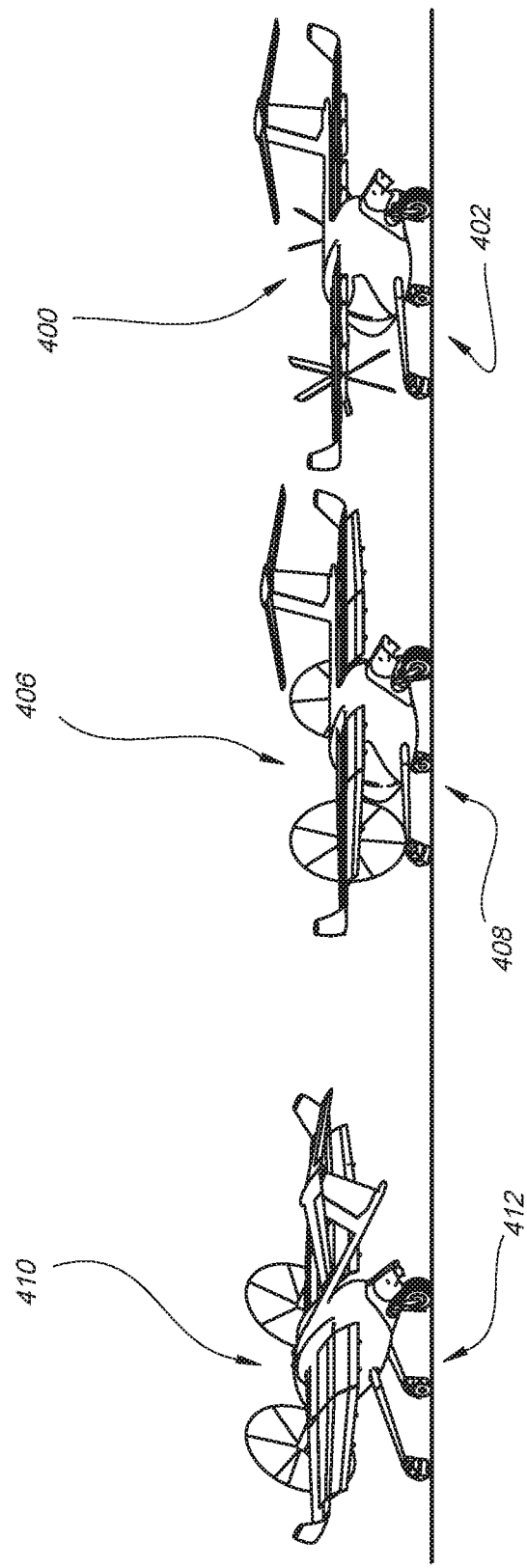
FIG. 17 is a rear left side perspective view showing a takeoff sequence for the landing gear of the present invention.

Thus, and looking first at FIG. 17 and concurrently referring back to FIG. 9, there are shown configurations of the aircraft during a takeoff sequence. The sequence in FIG. 17 proceeds over time from right to left. In the rightmost schematic image 400 of the inventive aircraft, the landing gear can be seen to be in a taxiing configuration 402. Both front and rear wheel steering are enabled and the wheels may be selectively driven, as needed. In the middle view 406, the aircraft landing gear is in its ground roll configuration 408, similar to the taxiing configuration except that the front landing gear has limited steering and the rear wheel is powered and its steering is locked. As the plane reaches and then exceeds a predefined landing-gear-enhanced rotation speed, 410, the landing gear control system rotates the front landing gear downwardly into a rotation configuration 412 to drive the aircraft nose up, increasing the angle of attack and dramatically and rapidly increasing lift. The rotation configuration 412 is shown more clearly in FIG. 9.

Figure 19:
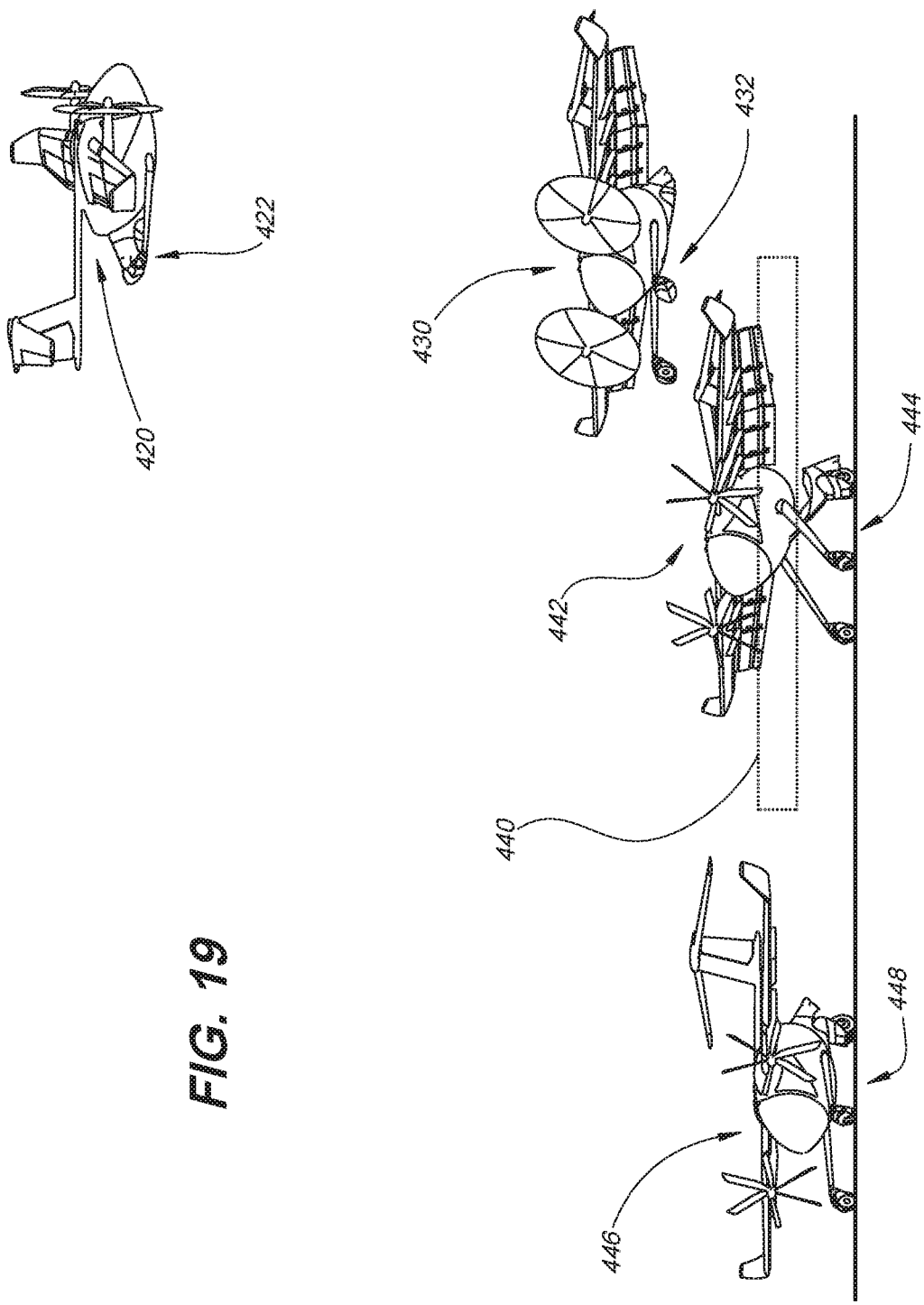
FIG. 19 is a front left side perspective view showing the landing sequence for the landing gear of the present invention.

Looking next at FIG. 19, and then back at FIGS. 6-9 and 11-13, there are shown a sequence of landing gear configurations corresponding to a typical landing as might be accomplished using the advantageous dynamically active landing gear of the present invention. FIG. 19 shows the developing configurations. In a cruise flight 420 the front and rear landing gear struts are fully retracted and folded underneath the airframe in a cruise flight configuration 422. Then as the aircraft reaches a late stage of final approach 430, the front landing gear is activated and deployed into an approach configuration 432. This may be characterized as a "reaching forward" configuration. Before and as this configuration is achieved, flight system controls align the aircraft and place it on an approach vector and glide slope that will enable it to land safely on the STOL runway. Then, when the aircraft passes through a target cloud 440, both front and rear landing great struts are rapidly extended downwardly. The target cloud referred to herein is a virtual envelope enclosing a predetermined volume of airspace defined by a range of possible safe landing positions above and close to the runway threshold on the approach when the aircraft meets certain parameters (e.g. ground speed). In embodiments, the target cloud may be a cuboid airspace having 10×10×1 meter dimensions. When the aircraft position 442 is detected as being in the target cloud, the dynamically active landing gear "reaches" down 444 toward the runway to more quickly bring the front and rear landing gear wheels into contact with the runway. The aircraft then rapidly slows to a roll out and taxiing configuration 446 with the front landing gear struts fully extended forward and the rear landing fully extended aft 448.

Figure 6:
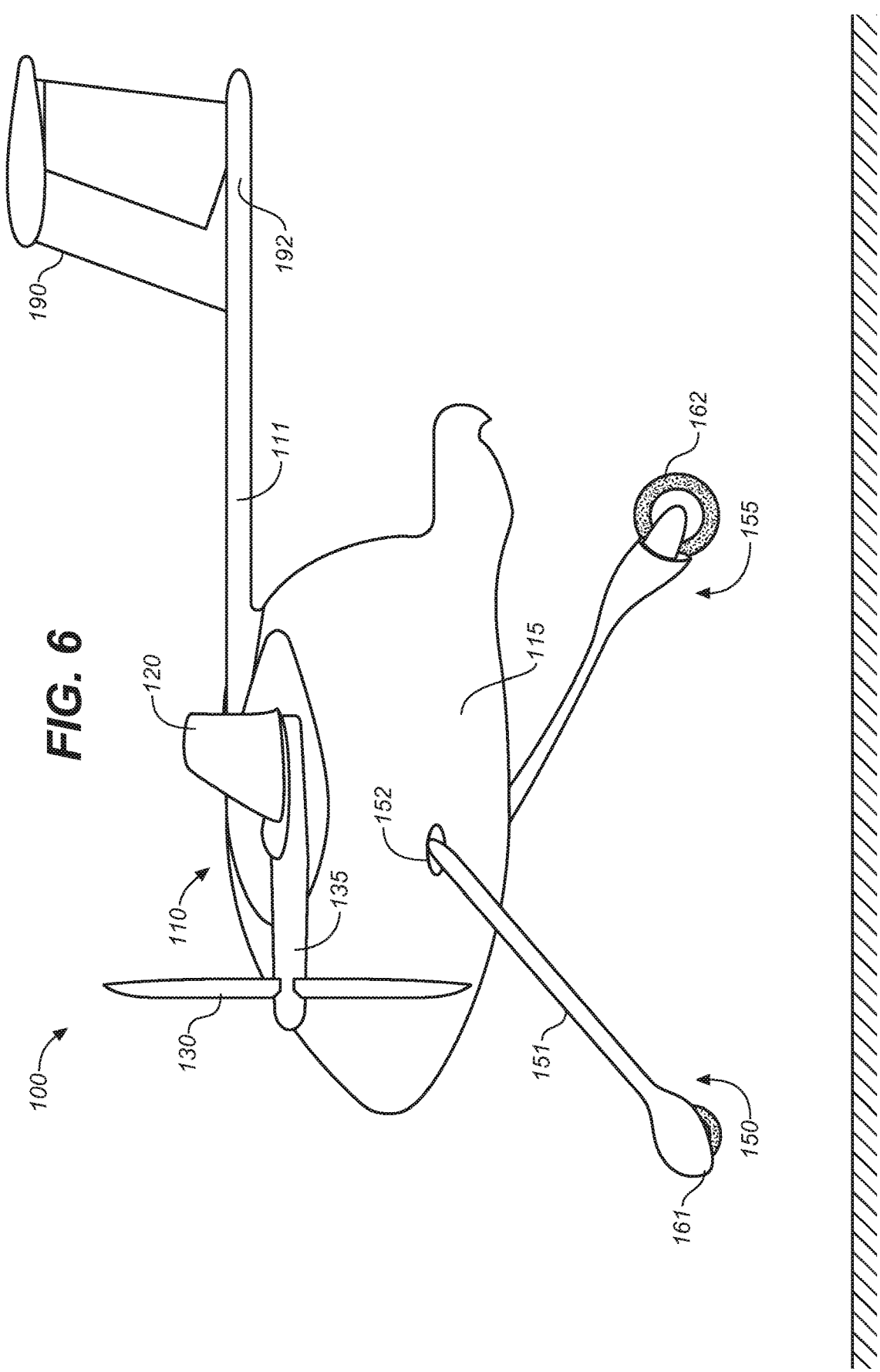
FIG. 6 is a side view in elevation of the aircraft in a landing configuration as the plane nears the landing zone, showing forward landing gear at a position nearing maximum downward deployment just before ground contact is made.
Figure 7:
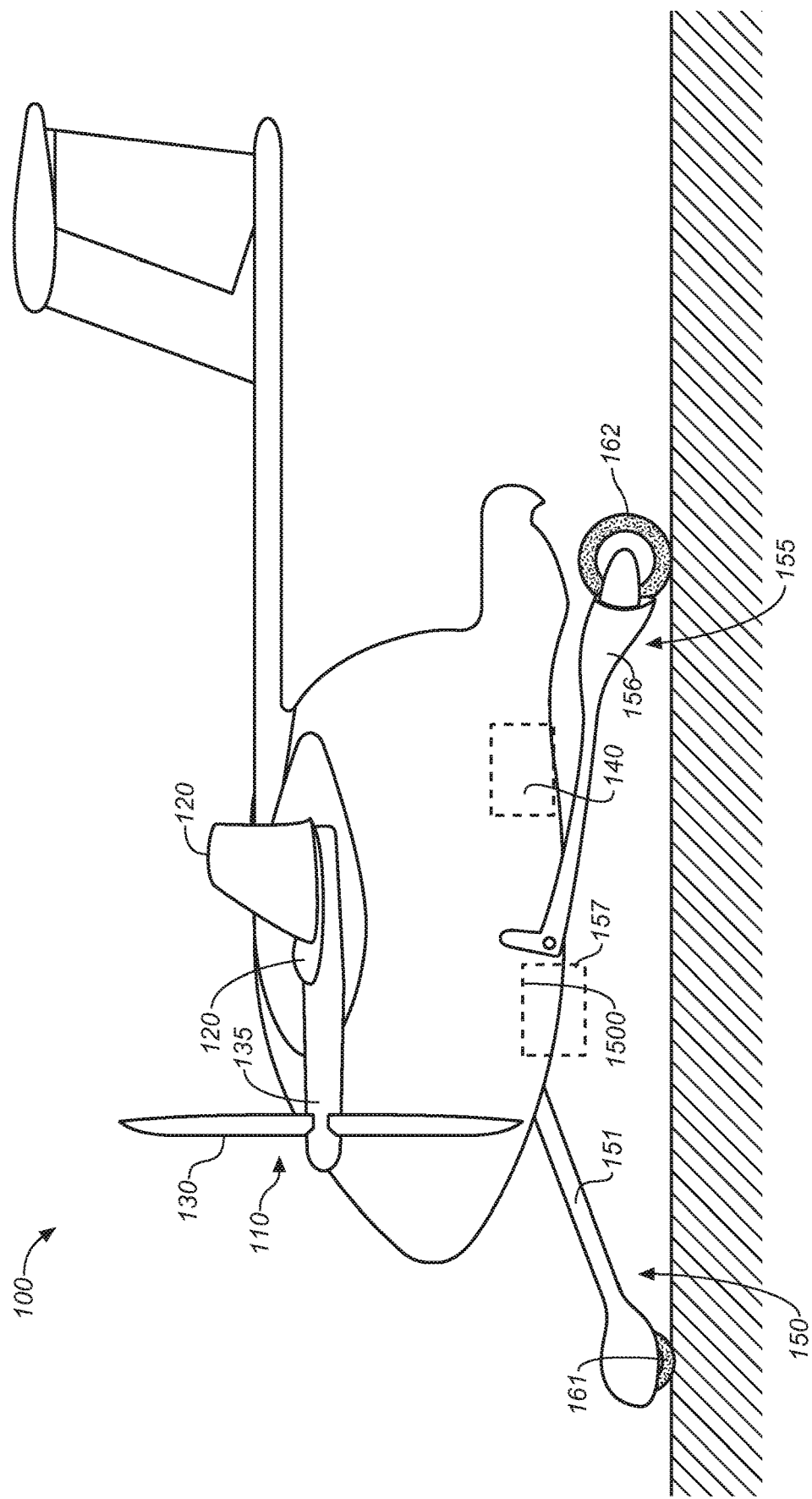
FIG. 7 is a left side view in elevation illustrating the operation and configuration of the forward landing gear and rear landing gear midway through the landing sequence.
Figure 8:
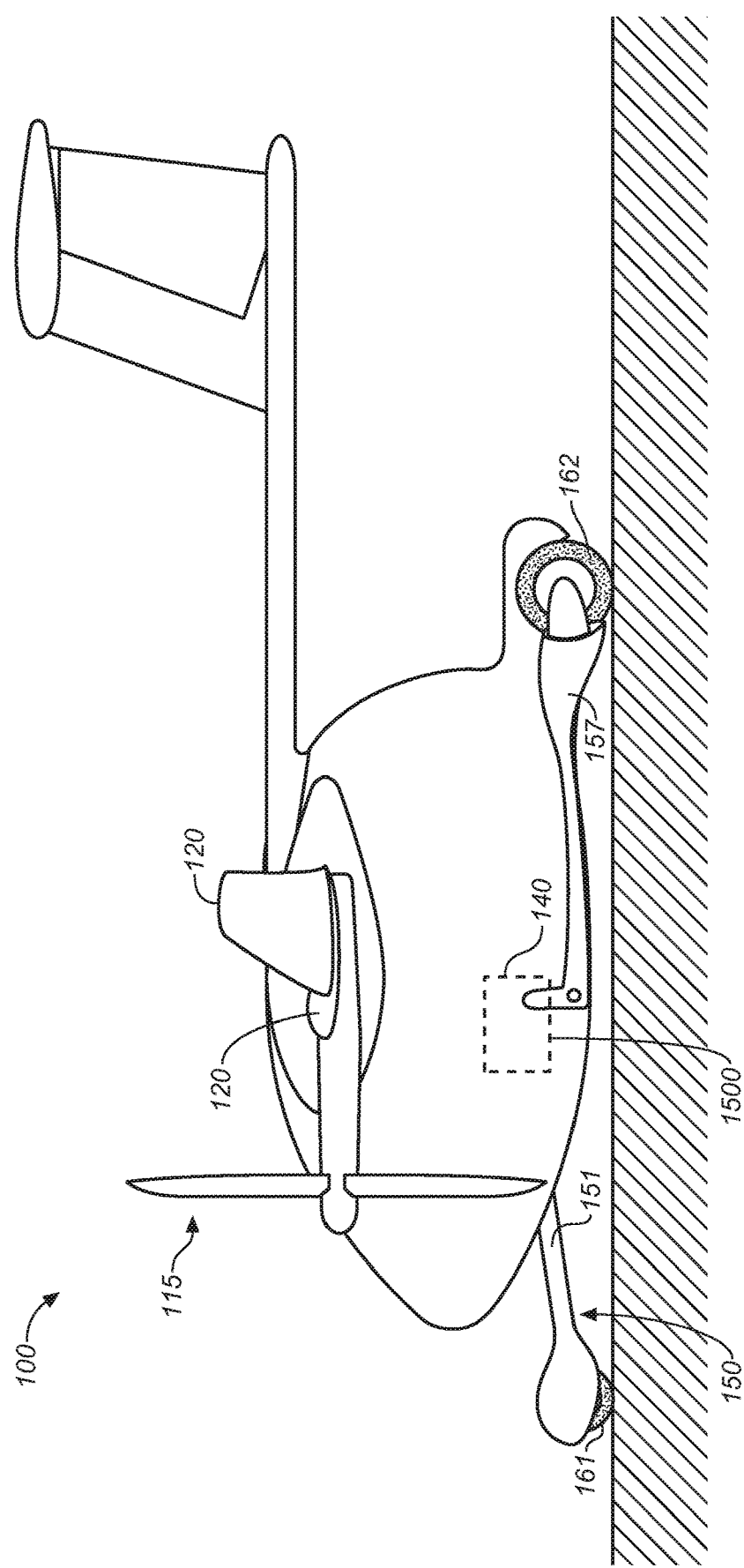
FIG. 8 is a left side view in elevation showing the landing gear in a taxi configuration as well as pre-rotation takeoff configuration.
Figure 9:
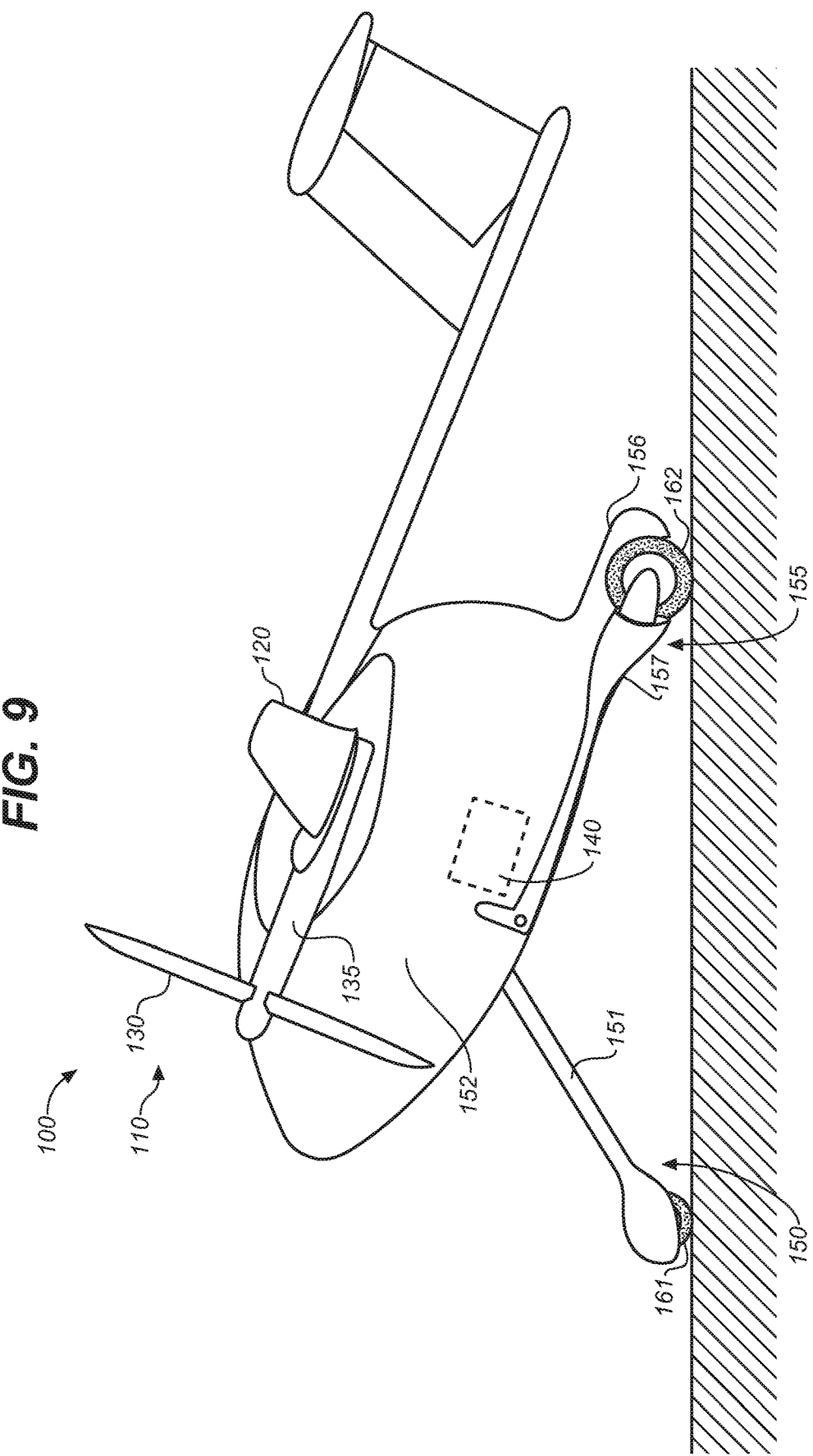
FIG. 9 is a left side view in elevation illustrating the operation of forward landing gear driving the aircraft nose up during rotation at takeoff.

FIGS. 6-8 show configurations intermediate those of FIG. 17. FIG. 6 shows the aircraft landing gear configuration as the target cloud is reached. FIG. 7 shows the landing gear as the energy of the vertical sink is absorbed by the landing gear. FIG. 8 shows the configuration as the landing gear reaches the taxiing configuration.

Figure 10:
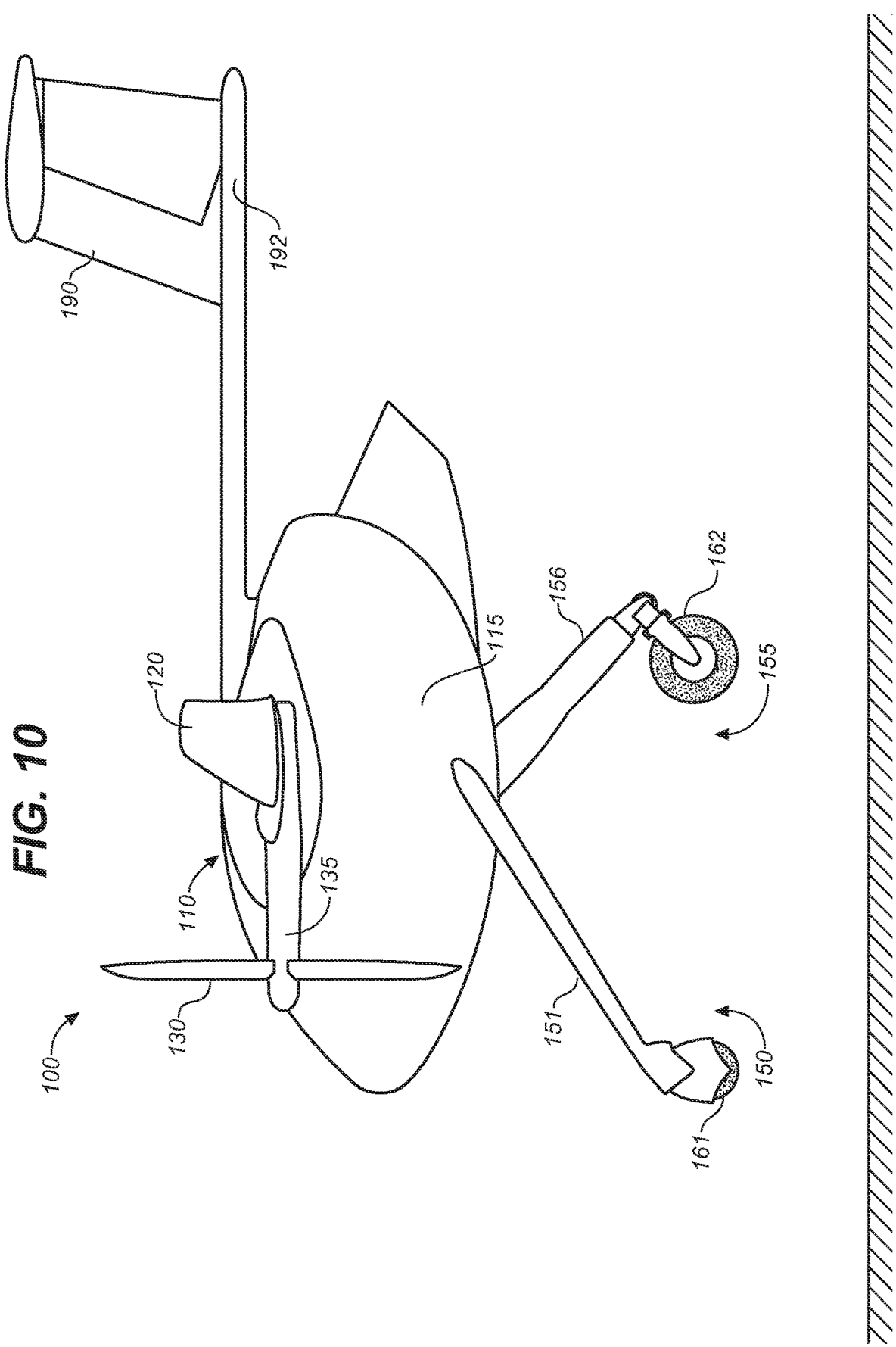
FIG. 10 is a left side view in elevation showing alternative landing gear structure in the pre-touchdown configuration during landing with the front and rear landing gear in the maximum downward deployment.
Figure 11:
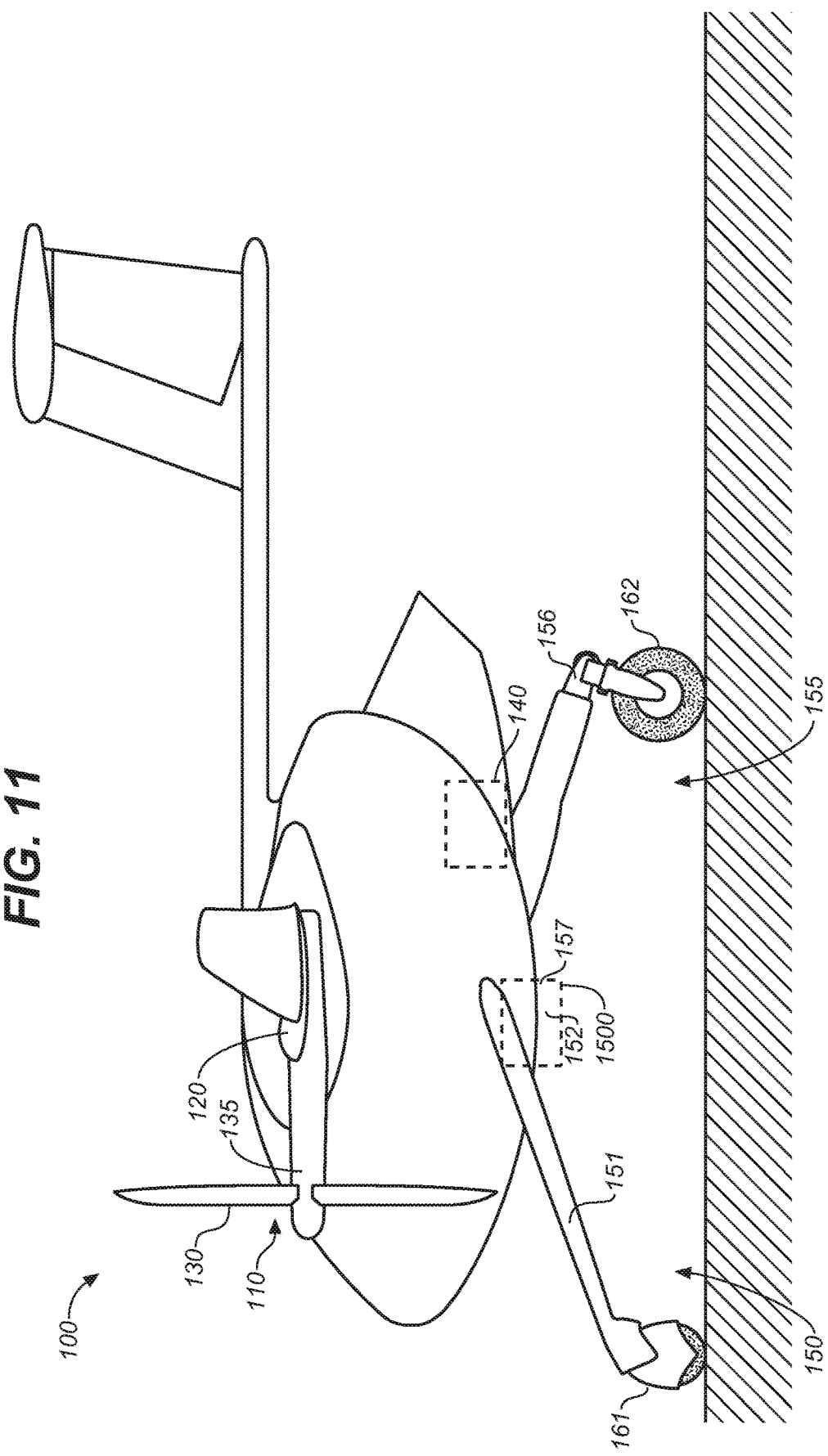
FIG. 11 is a side view in elevation thereof illustrating the operation and configuration of the forward landing gear and rear landing gear midway through the landing sequence.
Figure 12:
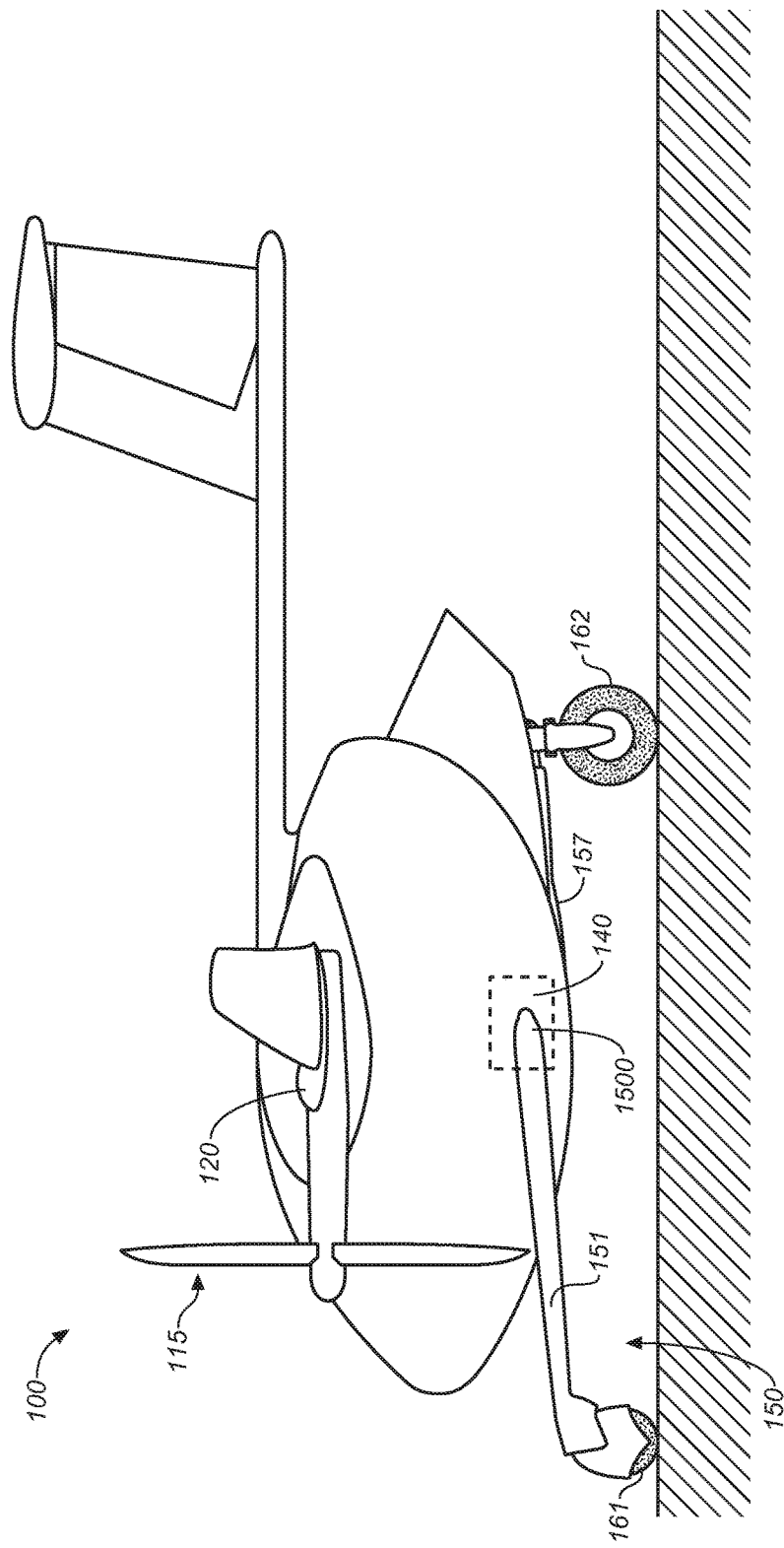
FIG. 12 is a left side view in elevation thereof showing the landing gear in a taxi configuration as well as pre-rotation takeoff configuration.
Figure 13:
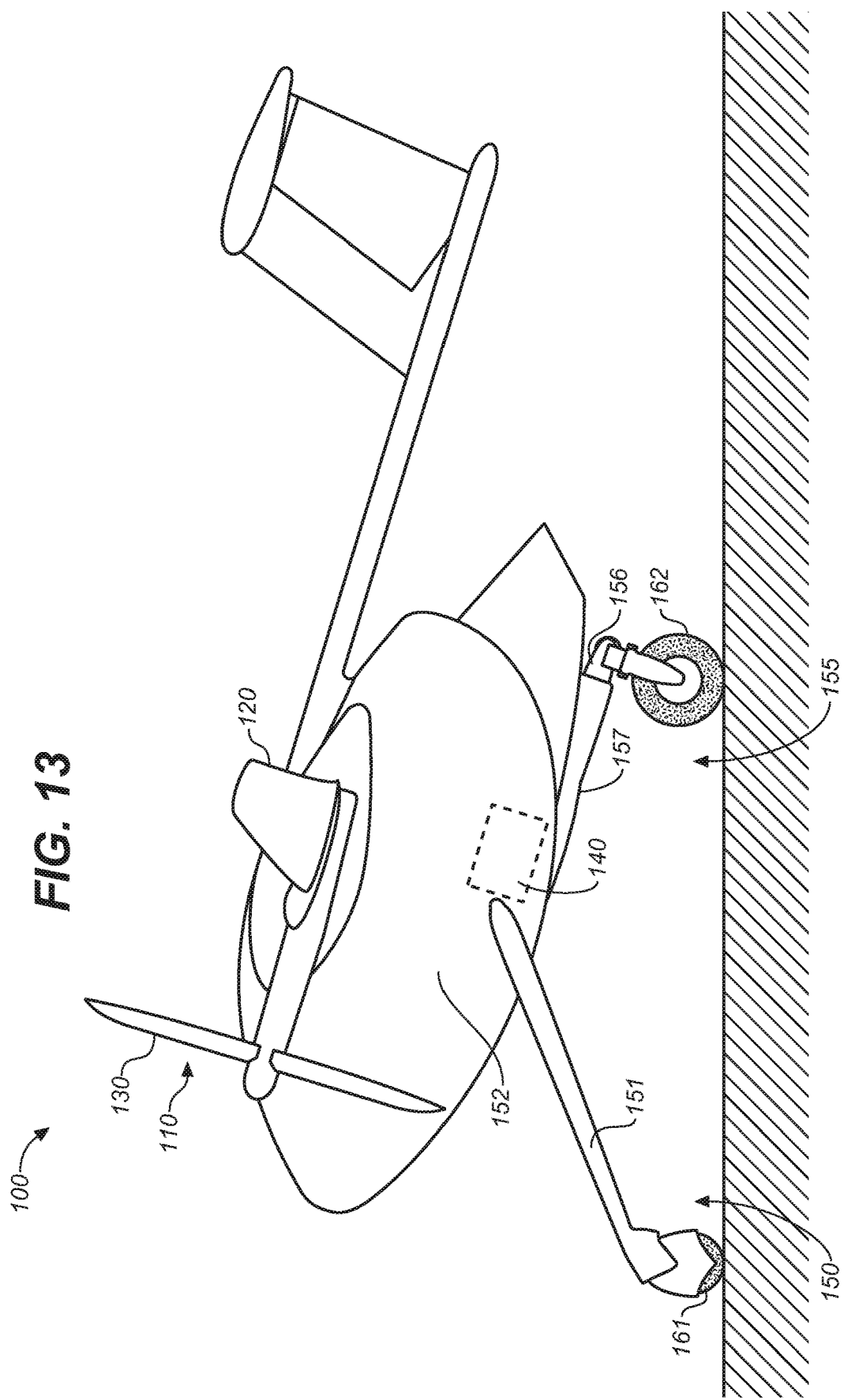
FIG. 13 is a left side view in elevation thereof illustrating the operation of forward landing gear driving the aircraft nose up during rotation at takeoff.
Figure 14:
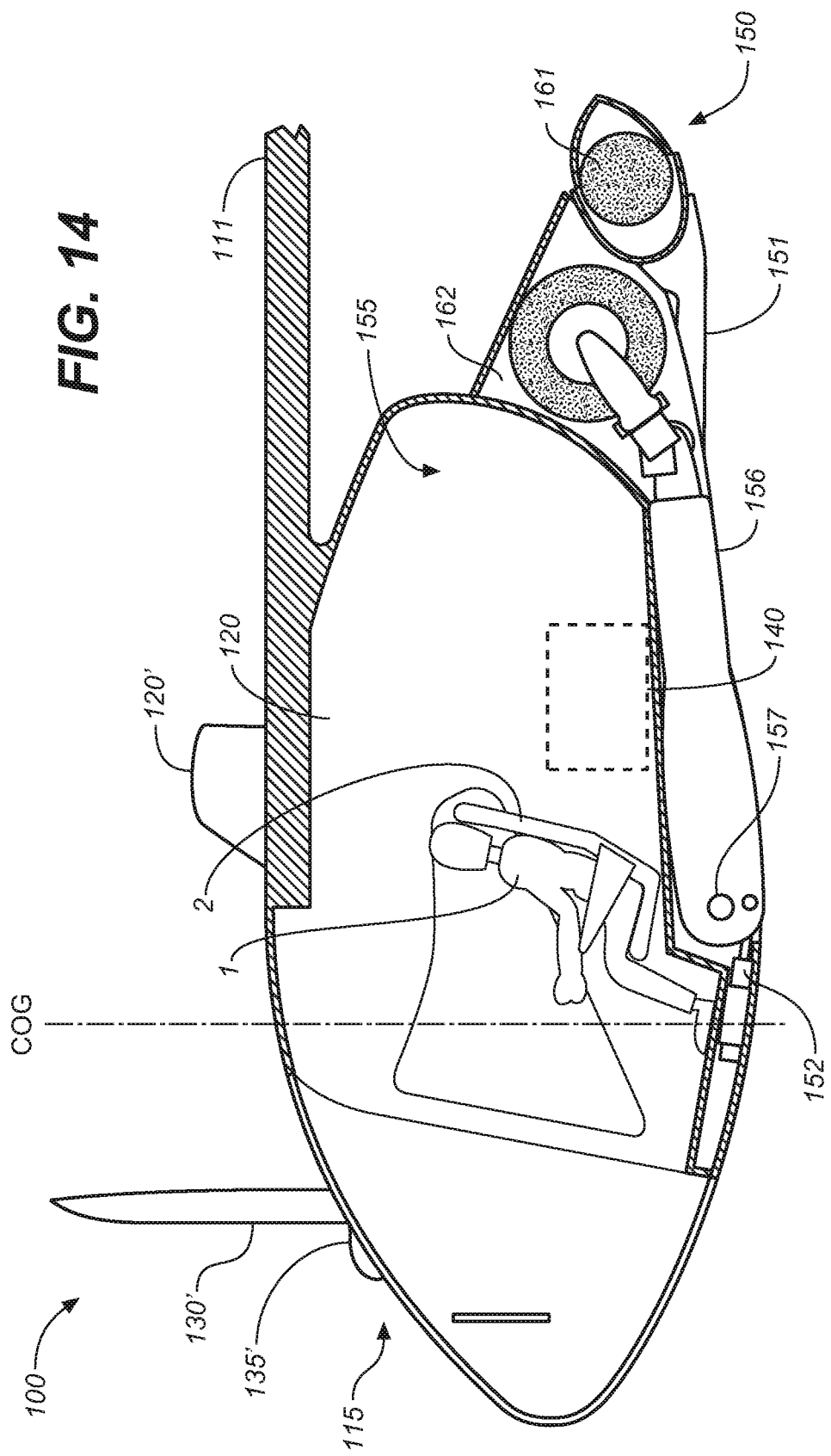
FIG. 14 is a schematic partial cross-sectional left side view in elevation taken along the longitudinal midline of the plane and showing the aircraft in flight, the aft portion of the plane and empennage excluded from the view.

FIGS. 10-12 show an alternative landing gear assembly in landing gear configurations corresponding in sequence to the landing gear configurations shown in FIGS. 6-9. Preliminarily, it should be noted that the salient alternative features include a rear landing gear wheel 162 rotatable about a pivot at the distal end of the rear landing great strut 156 so as to enhance the "reaching" feature during landing. The front landing gear wheels have a similar feature, enabling them to pivot and extend downwardly as the plane approaches the runway.

In preferred embodiments, the avionics system controls the landing gear deployment in coordination with the propeller and wheel drives for the precise movement with respect to location and speed to fully enable the STOL advantages. Such an avionics control system may be capable of remote or drone control, as well as autonomous or semi-autonomous control. More pertinently, the landing gear system control may be pilot controlled or, in a pilotless/ autonomously controlled embodiment, controlled with onboard system avionics or remotely controlled from a centralized control system.

Figure 18:
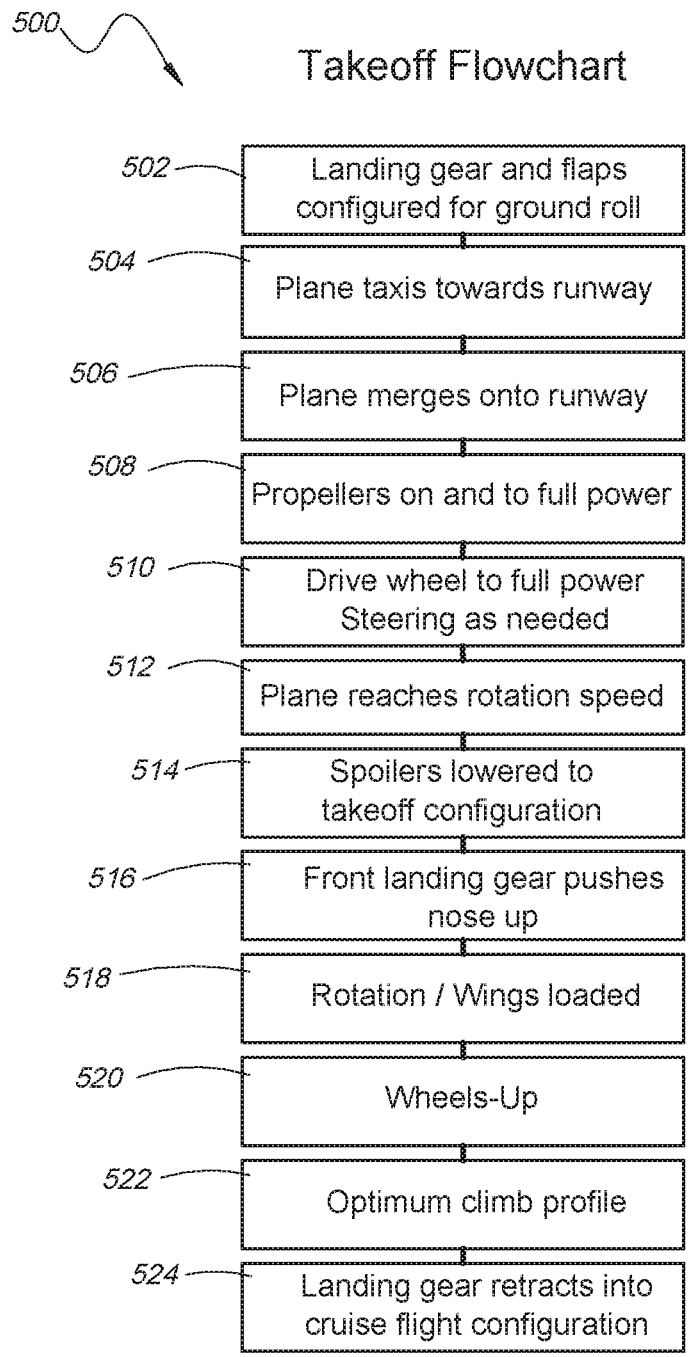
FIG. 18 is a flowchart showing the conditions monitored and the actions taken by the aircraft control systems during the takeoff sequence.

FIG. 18 shows the conditions monitored and actions taken by the control systems during a takeoff sequence 500. Cabin conditions, passenger safety checks, scheduling taxi and takeoff movements according to skyport/airport and area traffic, and the like are understood and assumed, and therefore not set out here. Rather, the focus is on the role played by the aircraft landing gear in facilitating a short field takeoff. Mention should be made, however, that all pre-flight activities are handled either by system controls alone or in combination with actions by flight personnel. For instance, in preparation for flight, the aircraft doors are closed and the plane shifted from a loading configuration to a taxi configuration, and the cabin and any passengers are readied for flight. The landing gear and flaps are configured for ground roll 502, and plane then taxis toward the runway 504. It then merges onto the runway and is aligned with the runway centerline 506. Full power is applied to the propellers 508. Drive wheel power is employed to supplement acceleration as needed 510 until rotation speed is reached 512. At that point, wings and flaps are deployed in a customary manner according to wind conditions, aircraft loading, and available runway length 514. Concurrently or immediately after, the front landing gear struts are driven downwardly so as to push the aircraft nose upward 516 to an optimal angle of attack to shift loading onto the wings to get into and through ground effect and into free flight at higher altitude 518. The landing gear is pulled up (wheels up) 520, and the plane is then configured 522 for optimal climb performance according to the climb requirements needed to clear obstacles, to remain clear of other traffic in the urban Traffic Control Area, and to achieve level flight altitude. The landing gear is then fully retracted into cruise flight configuration 524 and the aircraft proceeds to its destination.

Figure 20:
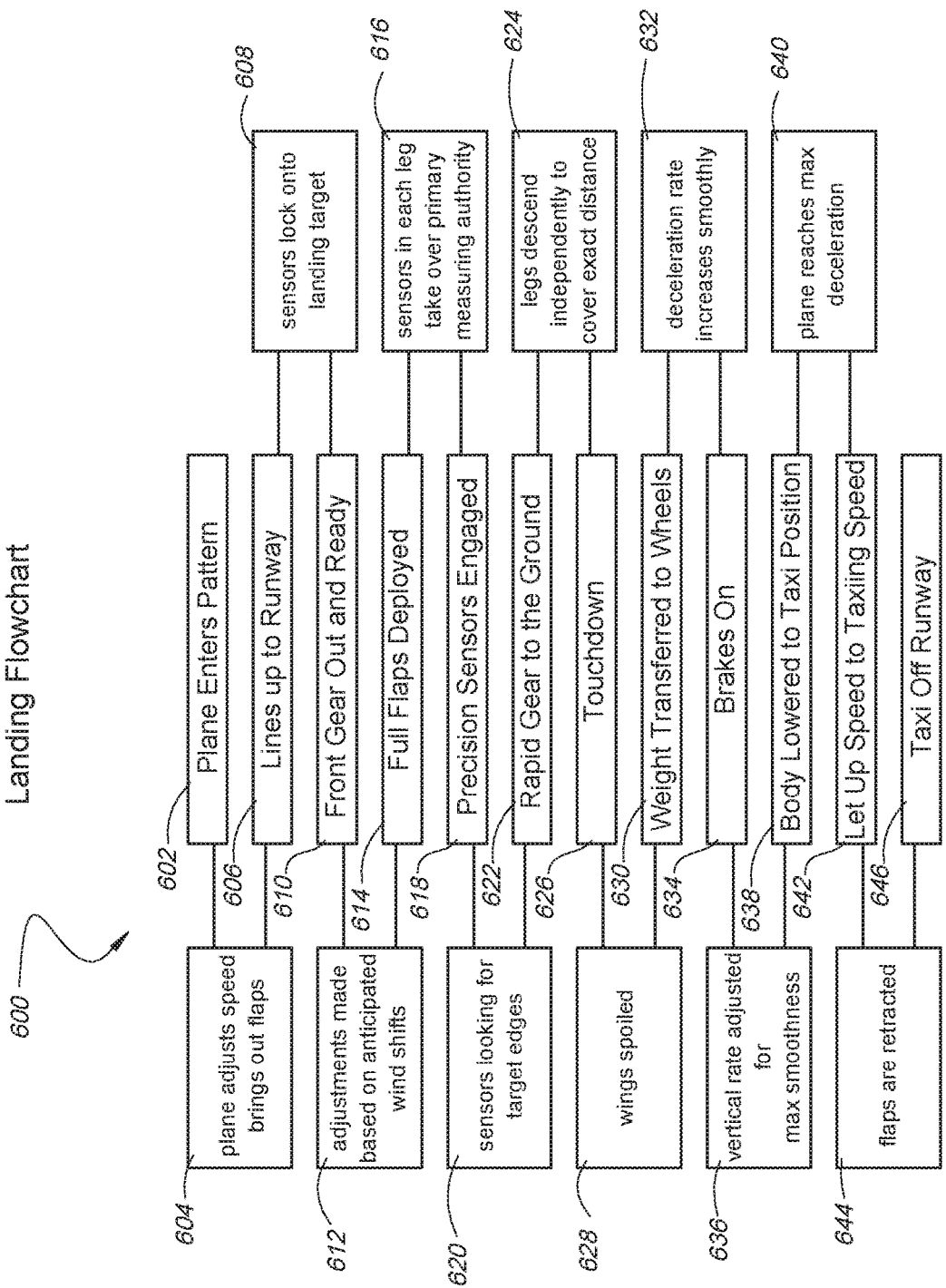
FIG. 20 is a flowchart showing the conditions monitored and the actions taken by the aircraft control systems during the landing sequence.

FIG. 20 shows the conditions monitored and the actions taken by the aircraft control systems as the aircraft approaches its destination and during the landing sequence at the destination 600. When the aircraft enters an airport/skyport traffic pattern 602 its speed and flap configuration are adjusted 604. When cleared for landing and vectored onto final approach, the aircraft turns to a final approach heading and is aligned with the runway centerline 606. Aircraft sensors then lock onto the landing target (the above-described target cloud) 608 and the front landing gear is extended outwardly 610 and readied for dynamic adjustments immediately preceding touchdown. Further fine adjustments are made in response to air and wind conditions and aircraft flight conditions (loading, groundspeed, wind direction, current flight control configurations, etc.) 612. Full flaps are deployed as needed 614. Sensors in the front landing gear struts measure the closing distance to the target cloud 616 and when the aircraft is within a predetermined distance, precision distance measuring sensors are engaged 618. These sensors search for and signal the control system when the aircraft is within the target cloud 620. In response, the landing gear is immediately deployed downwardly to "reach" for the ground 622. Landing great struts move independently to compensate for aircraft roll or pitch 624. The process continues to touchdown 626, at which time spoilers are actuated 628 and loading is shifted entirely from the wings to the landing gear 630. Deceleration continues 632, brakes are applied 634, and vertical sink energy is absorbed and adjusted to maximize landing smoothness and minimize jerk 636. Once a sufficiently low speed is achieved, the landing gear is moved into a taxi configuration 638. The aircraft will quickly reach maximum deceleration 640, and it will continue a short roll at taxi speed 642. The flaps are retracted 644, and the plane taxis off the runway 646, ready for unloading and for preparations for a next flight.

From the foregoing, it will be seen that in its most essential aspects, the present invention is an STOL aircraft that includes a fuselage having a port and a starboard side; at least one fixed wing coupled to the fuselage and extending laterally from each of the port and the starboard side; at least one propeller coupled to either the fuselage or the at least one fixed wing to provide thrust; a power plant to power the at least one propeller; front and rear landing gear modules operatively coupled to the fuselage, each of the front and rear landing gear modules including at least one rotatable landing gear strut with a wheel disposed on its distal end; landing gear motors for driving the front and the rear landing gear struts independently; and a control system for controlling the landing gear motors to deploy and retract the front and rear landing gear struts; wherein the control system is programmed to rotate one or more of the landing gear struts in response to aircraft flight condition and position data, including airspeed, ground speed, and position in relation to a runway.

Advantages of embodiments of the invention arise from the preferred exclusive use of electric motors for all the drive mechanisms to improve reliability and to decrease maintenance, as this eliminates fuel and hydraulic lines, which are prone to leaks and failure over time. Such leaks can create slip hazards on airstrips and reduce an aircraft's ability to decelerate safely in a limited space.

The foregoing disclosure is sufficient to enable those with skill in the relevant art to practice the invention without undue experimentation.

While the particular aircraft herein shown and disclosed in detail is fully capable of attaining the objects and providing the advantages stated herein, it is to be understood that it is merely illustrative of the presently preferred embodiment of the invention and that no limitations are intended to the detail of construction or design herein shown other than as defined in the appended claims. For instance, those with skill will appreciate that the advantageous feature of the landing gear—that of "reaching" for the runway surface close to touchdown—could be accomplished with alternative mechanical structures, such as telescoping landing gear struts or struts that articulate at a point along the length of the struts distal to the connections at the fuselage. Accordingly, the proper scope of the present invention should be determined only by the broadest interpretation of the appended claims so as to encompass all such modifications as well as all relationships equivalent to those illustrated in the drawings and described in the specification.

What is claimed as invention is:

1. An STOL aircraft, comprising:
a fuselage having a port and a starboard side;
at least one fixed wing coupled to said fuselage and extending laterally from each of said port and said starboard side;
at least one propeller coupled to either said fuselage or said at least one fixed wing to provide thrust;
a power plant to power said at least one propeller;
front and rear landing gear modules operatively coupled to said fuselage, each of said front and rear landing gear modules including at least one rotatable landing strut with a wheel disposed on its distal end, wherein said front landing gear module includes a port landing gear strut and a starboard landing gear strut, each rotatingly coupled to said fuselage;

landing gear motors for driving said front and said rear landing gear struts independently; and a control system for controlling said landing gear motors to deploy and retract said front and rear landing gear struts;

wherein said control system is configured to rotate one or more of said landing gear struts in response to aircraft flight condition and position data, including airspeed, groundspeed, and position in relation to a runway;

wherein said control system is programmed to drive said at least one front landing gear strut downwardly during takeoff to increase the aircraft angle of attack.

2. An electrically powered STOL aircraft, comprising:

a fuselage;

fixed wings coupled to said fuselage;

at least three electrically powered landing gear modules operatively coupled to said fuselage, each of said landing gear modules including a rotatable strut having a wheel disposed on an outer end;

an electric power supply disposed in said fuselage;

at least one propeller mounted on said fuselage or on said wings;

at least one power plant electrically coupled to said electric power supply to provide power to said at least one propeller;

an avionics control system for selectively deploying said at least three landing gear modules, including deploying said front landing gear downward to induce rotation on takeoff and actively deploying one or more of said landing gear modules downwardly to close the distance to the runway on landing and retract after touchdown to absorb energy.

3. The aircraft of claim 2, wherein at least one of said landing gear struts includes a driven wheel disposed on an outer end.

4. The aircraft of claim 3, wherein at least one wheel of each of said front and rear landing gear modules includes a driven wheel.

5. The aircraft of claim 2, wherein said avionics control system lowers at least one module of said landing gear modules on landing in response to aircraft flight conditions and position in relation to a runway.

* * * * *